United States Patent [19]

Katz

[11] 4,130,002

[45] Dec. 19, 1978

[54] SLIP COUPLING

[75] Inventor: Jonathon H. Katz, Brookline, Mass.

[73] Assignee: Teradyne, Inc., Boston, Mass.

[21] Appl. No.: 784,267

[22] Filed: Apr. 4, 1977

[51] Int. Cl.² ............................................. F16D 7/02
[52] U.S. Cl. .................................. 64/30 D; 403/225; 403/222
[58] Field of Search .............. 64/30 D, 27 NM, 30 E, 64/30 R, 11 R; 403/225, 228, 222, 372

[56] References Cited

U.S. PATENT DOCUMENTS

| 2,032,900 | 3/1936 | Alger | 403/228 X |
| 2,956,187 | 10/1960 | Wood | 64/11 R X |
| 3,175,110 | 3/1965 | Kohlhagen | 64/27 NM |
| 3,212,296 | 10/1965 | Benjamen | 64/30 R |

Primary Examiner—Andrew V. Kundrat

[57] ABSTRACT

Slip coupling incorporating bearing-quality friction surfaces and a flexible structure that isolates torsional vibration.

8 Claims, 3 Drawing Figures

SLIP COUPLING

FIELD OF THE INVENTION

This invention relates to a slip coupling particularly useful on the drive shaft of a synchronous electric motor.

BACKGROUND OF THE INVENTION

There are often problems in adapting a particular type of drive to the requirements of a system to be driven.

For example, in testing apparatus in which a member such as a printed circuit board must be cycled repeatedly between positions, the drive system must meet many special requirements. In many respects synchronous motors are an attractive drive option. However, the use of such a motor may require the use of sophisticated couplings to compensate for motor vibration; jerking during acceleration, overload, or stall conditions; or unequalized loading on multiple motors.

SUMMARY OF THE INVENTION

This invention features a novel slip coupling incorporating bearing-quality friction surfaces and a flexible structure that isolates torsional vibration, a feature particularly useful for absorbing start-up vibration associated with synchronous electric motors. The coupling is extremely compact, and accommodates small angular or parallel misalignment of the elements being coupled. The use of low friction bearing surfaces makes for long useful life. In preferred embodiments compressed rubber provides radial force to hold the bearing surfaces in frictional contact, while simultaneously providing for vibration absorption.

Other novel features, elements, aspects, and advantages and combinations thereof will be set forth hereinafter.

DESCRIPTION OF THE PREFERRED EMBODIMENT

I now turn to a description of a presently preferred embodiment of the invention.

DRAWINGS

Figure 1:
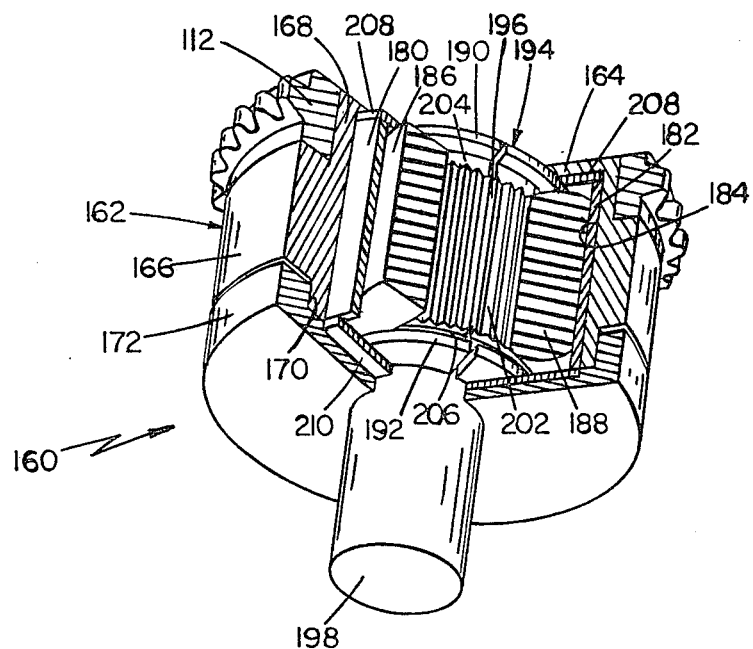
Figure 2:
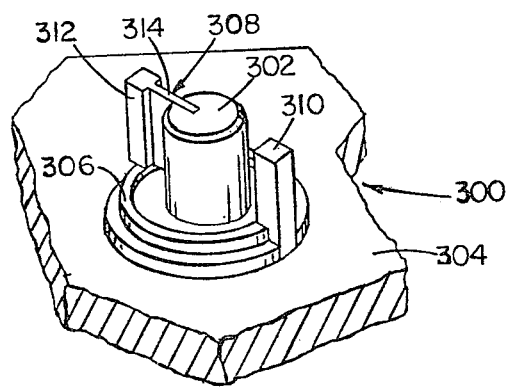
Figure 3:
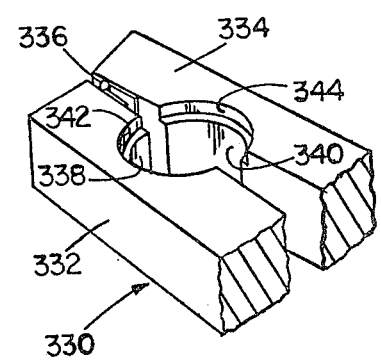

FIG. 1 is an isometric view, partially broken away and partially in section, of a slip coupling; and FIGS. 2 and 3 are fragmentary isometric views of tools useful in assembling the coupling.

DESCRIPTION

The embodiment shown in the drawings and its operation are now described.

1. Embodiment

In my copending application entitled Circuit Board Testing Apparatus (incorporated herin by reference) there is disclosed apparatus in which a carrier assembly is driven by synchronous motors through sprocket wheels and chains. Two motors drive each chain.

Each motor is coupled to its chain through a vibration absorbing slip coupling 160 (FIG. 1). Stainless steel outer coupling member 162 has an integral end cap 164 and a body 166 of annular cross-section with end portions 168 and 170 of reduced outside diameter on which are respectively pressed sprocket wheel 112 and separate end cap 172. Inner coupling members 180 and 182, each of semi-annular cross-section, are pressed into contact with the polished inside cylindrical surface 184 of body 166 by compressed Butyl rubber members 186 and 188 (also semi-annular in cross-section and with their transverse edges angularly aligned with the transverse edges of members 180 and 182, respectively) which are retained between end flanges 190 and 192 of stainless steel spool 194. Spool 194 is of generally annular cross-section and is slit radially at 196 to allow the sleeve to be expanded to fit over motor shaft 198 and then grip the shaft frictionally, as a spring. Spool 194 has knurls 202 to grip the rubber, and is relieved at 204 and 206 adjacent flanges 190 and 192 to provide space for excess rubber upon compression of members 186 and 188 during assembly. Teflon washers 208 and 210 reduce friction between end caps 164 and 172 and the inner members of the coupling; the large surface area of flanges 190 and 192 protects the washers from being cut into by the steel spool 194.

The large surface area of contact between the inner and outer coupling members provides high friction force and goes against the approach of using a high coefficient of friction material in the coupling; the inner members 180 and 182 are Delrin 100 (Du Pont trademark), durable enough to withstand many machine cycles, and with approximately equal static and dynamic coefficients of friction with steel surface 184.

Spool 194 is made by boring its axial hole to motor shaft diameter, cutting slit 196, compressing the spool to close the slit, and strain relieving the spool in its compressed state so that it must be expanded to fit on shaft 198.

FIG. 2 shows a jig 300 useful in assembling coupling 160. Cylindrical post 302, of diameter slightly less than that of the axial bore of spool 194 in the relaxed state of the spool, is mounted on base 304. Rim 306, of inside diameter slightly larger than the outside diameter of spool flanges 190 and 192, surrounds post 302, and extends above base 304 by slightly more than the thickness of flanges 190 and 192. Element 308 is of T-shaped cross-section and extends radially outwardly from post 302 on top of rim 306. Element 310 extends along base 304 radially outwardly from rim 306 to 180° to element 308, and has a width equal to that of the wide part 312 of element 308.

To assemble coupling 160, jig 300 is first lubricated with a Teflon spray. Spool 194 is slipped over post 302 with narrow part 314 of element 308 in slit 196. Butyl members 186 and 188 are placed on rim 306 wih their concave surfaces in contact with the knurled surface of spool 194; members 186 and 188 are separated by elements 308 and 310. Delrin members 180 and 182 are placed on base 304 outside of rim 306, with their concave surfaces in contact with the convex surfaces of members 186 and 188, and are also separated by elements 308 and 310. The assembly thus far is lifted off jig 300 as a unit and transferred to tool 330 (FIG. 3).

Tool 330 has arms 332 and 334 hinged at 336. Opposing semi-cylindrical bores 338 and 340 are provided in arms 332 and 334, respectively, each with a counterbore 342, 344. The axial extent of bores 338 and 340 below the counterbores is equal to the axial dimension of spool 194. The common diameter of counterbores 342 and 344 is slightly larger than the outside diameter of end portion 170 of outer coupling member 166.

The assembly removed from jig 300 is placed in bores 338 and 340 and compressed by squeezing arms 332 and 334 together. End portion 170 of member 166 is placed in counterbores 342 and 344. The assembly is then turned over so that member 166 is on a table, and a suitable pusher is used to slide spool 194 and elements 180, 182, 186, and 188 into member 166.

2. Operation

In operation, rubber members 186 and 188 in coupling 162 have sufficient flexibility to allow about +5° of rotation between spool 194 and inner coupling member 180 and 182 in response to vibrational loading forces. This permits (e.g., in an application using parallel synchronous motors) each motor to independently undergo the vibration necessary for start-up; and, furthermore, by absorbing vibration, reduces operating noise. The ability of the inner coupling members to slip along surface 184 in response to heavier loading provides for gradual acceleration when inertial forces might otherwise cause jerking and/or stalling of a motor, equalizes the loads on parallel operated motors, and allows synchronous motors to run in phase with each other, and reduces machine noise in the event of a stall. The force fit of sleeve 194 and the motor shaft is sufficiently tight to lock the two parts rotationally under all loads up to and beyond the slip threshold of the coupling, and provides for overall compactness.

Conclusion

Other embodiments are within the claims below.
What is claimed is:
1. A slip coupling for a drive shaft, comprising
outer coupling means surrounding said shaft,
radially expandable inner coupling means between said outer means and said shaft, and
resilient means between said shaft and said inner coupling means to press the latter into frictional engagement with said outer means while providing rotational flexibility between said shaft and said inner coupling means to thereby provide isolation from torsional vibration,
wherein said inner coupling means comprises a plurality of separate members, and
wherein said inner coupling means is split along angularly spaced lines to provide said separate members, and said resilient means comprises a plurality of members angularly aligned with said separate members.
2. The coupling of claim 1 wherein said members are of Delrin.
3. The coupling of claim 2 wherein said outer coupling means is of stainless steel.
4. A slip coupling for a drive shaft, comprising
outer coupling means surrounding said shaft,
radially expandable inner coupling means between said outer means and said shaft, and
resilient means between said shaft and said inner coupling means to press the latter into frictional engagement with said outer means while providing rotational flexibility between said shaft and said inner coupling means to thereby provide isolation from torsional vibration, further comprising slippery washers adjacent the ends of said inner coupling means.
5. A slip coupling for a drive shaft, comprising
outer coupling means surrounding said shaft,
radially expandable inner coupling means between said outer means and said shaft, and
resilient means between said shaft and said inner coupling means to press the latter into frictional engagement with said outer means while providing rotational flexibility between said shaft and said inner coupling means to thereby provide isolation from torsional vibration,
further comprising a member between said shaft and said inner coupling means, said member being in spring-like, frictional engagement with said shaft with a friction force greater than the force required to slip said inner and outer coupling means,
wherein said member has an outer surface frictionally engaging said resilient means.
6. The coupling of claim 5 wherein said member is a spool having end flanges, and said resilient means is compressed between said flanges.
7. The coupling of claim 6 further comprising slippery washers outwardly adjacent said flanges and the ends of said inner coupling means.
8. A slip coupling for a drive shaft, comprising
outer coupling means surrounding said shaft,
radially expandable inner coupling means between said outer means and said shaft, and
resilient means between said shaft and said inner coupling means to press the latter into frictional engagement with said outer means while providing rotational flexibility between said shaft and said inner coupling means to thereby provide isolation from torsional vibration,
further comprising a member between said shaft and said inner coupling means, said member being in spring-like, frictional engagement with said shaft with a friction force greater than the force required to slip said inner and outer coupling means,
wherein said member is of annular cross-section and is split along a radial plane, said member when relaxed having an axial opening of diameter less than that of said shaft, so that said member must be expanded to fit said shaft in said opening.

* * * * *